(12) United States Patent
Walters

(10) Patent No.: US 7,549,953 B2
(45) Date of Patent: Jun. 23, 2009

(54) QUICK CHANGE TOOL HOLDER

(75) Inventor: Daniel Walters, Bradenton, FL (US)

(73) Assignee: American Torch Tip, Brandenton, FL (US)

( * ) Notice: Subject to any disclaimer, the term of this patent is extended or adjusted under 35 U.S.C. 154(b) by 163 days.

(21) Appl. No.: 11/452,834

(22) Filed: Jun. 14, 2006

(65) Prior Publication Data

US 2007/0290457 A1    Dec. 20, 2007

(51) Int. Cl.
- B23Q 13/00 (2006.01)
- B23C 5/26 (2006.01)
- B23B 31/00 (2006.01)

(52) U.S. Cl. ............... 483/65; 409/232; 408/239 A; 279/145; 279/143; 279/42; 279/48

(58) Field of Classification Search ................ 409/232, 409/234; 408/239 A; 279/143, 144, 145, 279/42, 43.1, 46.2, 46.1, 46.4, 48, 52; 82/160, 82/158; 483/65, 59

See application file for complete search history.

(56) References Cited

U.S. PATENT DOCUMENTS

| | | | | |
|---|---|---|---|---|
| 2,478,195 | A | * | 8/1949 | Hull ............................ 279/145 |
| 3,734,513 | A | * | 5/1973 | Kanebako et al. ............. 279/48 |
| 4,436,463 | A | * | 3/1984 | Rea ............................ 409/232 |
| 4,496,163 | A | * | 1/1985 | Bernfeld ..................... 279/145 |
| 4,668,138 | A | | 5/1987 | Carter |
| 4,714,389 | A | | 12/1987 | Johne |
| 4,817,972 | A | * | 4/1989 | Kubo .......................... 279/42 |
| 5,452,631 | A | | 9/1995 | Erickson |
| 5,593,258 | A | | 1/1997 | Matsumoto et al. |
| 6,270,086 | B1 | | 8/2001 | Lloyd |
| 6,352,395 | B1 | | 3/2002 | Matsumoto et al. |
| 6,517,299 | B1 | | 2/2003 | Lin |
| 6,789,299 | B1 | | 9/2004 | Kidder |
| 6,908,085 | B2 | | 6/2005 | Gerber |
| 6,923,451 | B2 | | 8/2005 | Taguchi et al. |
| 2008/0054575 | A1 | * | 3/2008 | Hartmann ................... 279/145 |
| 2008/0179839 | A1 | * | 7/2008 | Walters ...................... 279/51 |

* cited by examiner

Primary Examiner—Erica E Cadugan
(74) Attorney, Agent, or Firm—Emerson, Thomson & Bennett

(57) ABSTRACT

A quick-change tool-holding method and system for securing a tool within a primary tapered recess is disclosed. The tool-holding system includes an adaptor having a tapered exterior that closely approximates interior dimensions of the tapered recess to fit snugly within the tapered recess. The adaptor defines a secondary interior tapered recess and includes an exterior threaded portion about an aperture leading into the secondary tapered recess. A threaded fastener is also provided to include a threaded portion that is cooperable with threads provided adjacent to the primary tapered recess to secure the adaptor therein, as well as an aperture through which at least a portion of the exterior threaded portion of the adaptor extends when the adaptor is secured within the primary tapered recess by the threaded fastener. A collet comprising a plurality of slits formed therein is provided to allow the collet to elastically deform and constrict the tool when placed within an internal passage defined by the collet. An end cap with threads that are cooperable with the exterior threaded portion of the adaptor is included to urge the collet into the secondary tapered recess resulting in a constricting force on the tool within the collet's internal passage.

10 Claims, 2 Drawing Sheets

QUICK CHANGE TOOL HOLDER

FIELD OF THE INVENTION

The present invention is directed generally to a tool holder, and more specifically to a quick-change adaptor system for coupling a plurality of differently-sized tools to a machining instrument.

BACKGROUND OF THE INVENTION

Traditionally, milling machines, lathes and other machining instruments have been provided with a tapered recess at the end of a rotatable spindle or elsewhere on a machine for receiving a tool such as a bit for performing milling or other operations on a workpiece. Such configurations typically include an elastically deformable collet that is placed within the tapered recess to securely fix the tool within the tapered recess. The collet also maximizes the concentricity between the tapered recess and the tool being secured therein. The force imparted on the collet by the walls of the tapered recess as the collet is urged inwardly into the tapered recess constricts the collet about a tool partially inserted into the hollow cavity of the collet, thereby securing the tool to the machine.

Precision machining operations usually require almost perfect concentricity between the tool and the spindle to which it is coupled. Ensuring this concentricity can make placing a tool in the tapered recess a delicate and time-consuming process. And due to the cost of precision machining instruments, it is impractical to utilize a dedicated machining instrument for working with each size of tool commonly found in a typical machine shop. Thus, many different-sized tools will often be swapped in and out of a given machining instrument, making the significant down time of the machining instrument every time the tool is to be changed costly to the owner of said instrument.

Previous attempts at to couple a variety of different tool sizes to the rotatable spindle or other feature of a machining instrument have included an externally-threaded member adjacent to the end of the spindle to which the tool is to be coupled. The tapered recess itself could be removed from the spindle or other feature and a different-sized tapered recess substituted in its place on the externally-threaded member. This type of tool holder configuration was complex, and required removal of the tapered recess from the machining instrument each time a different-sized tool was to be secured thereto. The significant changeover times associated with this type of configuration creates long downtimes that are costly to the machine's owner. This downtime is lengthened by the need to insert the tool into the tapered recess of the tool holder after the tool holder was installed on the rotatable spindle of the machine to set the proper tolerances between the tool on the machine and the workpiece.

Other tool holders have employed a turret with a plurality of tool stations that could receive tools having a variety of different dimensions. Such configurations included a tapered recess in which a collet encircling at least a portion of the tool was received. Again, such configurations were costly, and required complex control circuitry to select and install the proper tool to be used for machining a specific workpiece.

Accordingly, there is a need in the art for a quick-change tool holder for securing tools having a variety of different sizes to an existing tool holder provided adjacent to the end of a rotatable spindle or elsewhere on a machining instrument. The quick-change tool holder can be used to rapidly change between tools secured to the machining instrument, and can optionally be compatible with existing tool holders provided to conventional machining instruments.

BRIEF SUMMARY OF THE INVENTION

According to one aspect, the present invention provides a quick-change tool-holding system for securing a tool within a primary tapered recess adapted for receiving the tool and provided to a location where the tool is to be supported. The tool-holding system comprises an adaptor having a tapered exterior that closely approximates interior dimensions of the tapered recess to fit snugly within the tapered recess, wherein the adaptor defines a secondary interior tapered recess and comprises a threaded portion coaxial with an aperture leading into the secondary tapered recess. A threaded fastener is provided, wherein the threaded fastener comprises a threaded portion cooperable with threads provided adjacent to the primary tapered recess to secure the adaptor therein, and an aperture through which at least a portion of the threaded portion of the adaptor extends when the adaptor is secured within the primary tapered recess by the threaded fastener. A collet comprising a plurality of slits formed therein to allow the collet to elastically deform is provided to constrict the tool when placed within an internal passage defined by the collet. An end cap with threads that are cooperable with the threaded portion of the adaptor is also provided to urge the collet into the secondary tapered recess resulting in a constricting force on the tool within the collet's internal passage.

According to another aspect, the present invention provides a method of securing a tool to a rotatable spindle, to a stationary tool station, or any other feature of a machining instrument. The method comprises the steps of selecting a desired tool for performing a machining operation, selecting a suitably-sized collet for encircling at least a base portion of the desired tool to be used for performing a machining operation, and inserting the base portion of the collet into an interior passage defined by the collet. The method further comprises the steps of inserting the collet into a secondary tapered recess of an adaptor along a longitudinal central axis of the adaptor, and placing an annular threaded fastener over an externally-threaded portion of the adaptor that defines an aperture leading into the secondary tapered recess such that at least a portion of the externally-threaded threaded portion of the adaptor extends through the annular threaded fastener. Additional steps include securing the collet and the base portion of the tool within the secondary tapered recess with an end cap that is cooperable with the externally-threaded portion of the adaptor to form a tool assembly, and securing the tool assembly within a primary tapered recess that is provided to the machining instrument.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION OF ILLUSTRATIVE EMBODIMENTS

Figure 1:
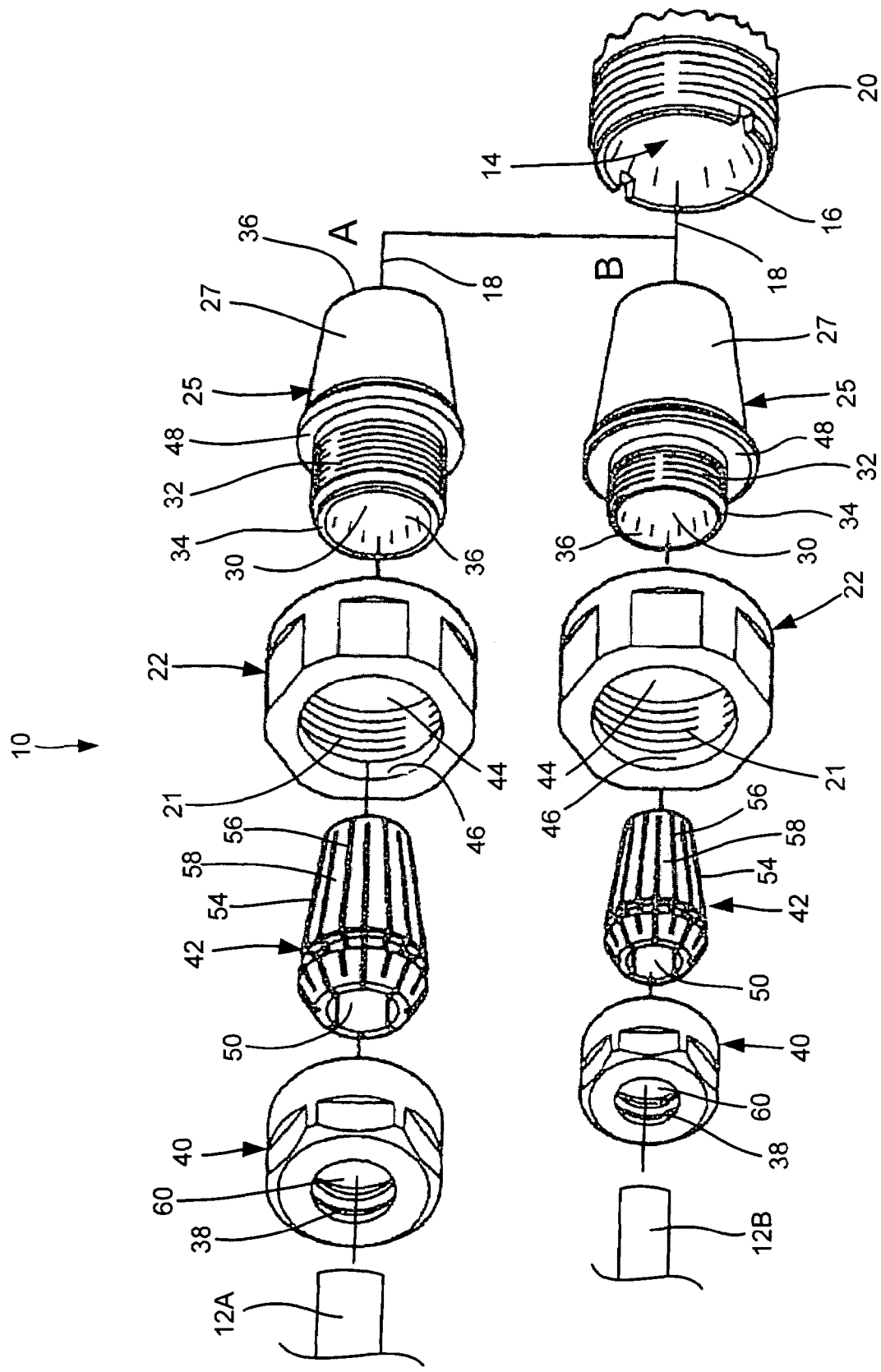
FIG. 1 is an exploded view of a tool-holding system in accordance with illustrative embodiments of the present invention, wherein adaptors with different internal dimensions are shown.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

FIG. 1 provides an exploded view of two illustrative embodiments of a quick-change tool-holding system 10 in accordance with the present invention for securing at least a portion of a tool 12A or 12B (both of which are generally referenced herein by numeral 12) within a primary tapered recess 14 provided adjacent to an end of a rotatable spindle (not shown) of a machining instrument. Although the embodiments discussed below refer to the primary tapered recess 14 as being located adjacent to the end of a rotatable spindle, it is to be understood that the tool-holding system 10 of the present invention can be compatible with a primary tapered recess at any location of a machining instrument, or anywhere it is desired to support the tool. For example, the tool-holding system 10 can be compatible with a stationary tool station on or in the machining instrument or elsewhere in a machine shop for storing the tool when not in use. However, for the sake of brevity and to clearly describe the tool-holding system 10 and a method of using same, the description that follows simply references the primary tapered recess 14 provided adjacent to an end of the rotatable spindle. Also, the illustrative embodiments in FIG. 1 are distinguished from each other by the letter A, which references the upper embodiment in FIG. 1, and the letter B, which references the lower embodiment in FIG. 1. The illustrative embodiments are substantially similar, and differ primarily by the inside dimensions of a secondary tapered recess 30 of an adaptor 25 for receiving different-sized tools 12, as described below.

The machining instrument can be a drill press, CNC machine, lathe, and any other similar device that can utilize a removable tool to perform machining operations on a workpiece. Similarly, the tool 12 can be any elongated object such as a drill or milling bit, a lathe cutter, and any other tool having a generally-cylindrical base portion that can be received within a substantially tubular recess. Only the base portion of the tool 12 is shown in FIG. 1 to illustrate the generally-cylindrical shape of said base portion. Further, the base portion of the tool 12 need not be perfectly cylindrical to be considered generally-cylindrical, but instead, can also optionally be slightly tapered.

The primary tapered recess 14 is also generally cylindrical in shape, and has an inside diameter that decreases along its length from an aperture 16 leading into the tapered recess 14 and progressing towards an innermost terminal wall. Although any degree of taper suitable for receiving a collet is within the scope of the present invention, the taper can be of any degree, such as 8 degrees relative to a central axis 18 of the primary tapered recess 14, which is consistent with an ER standard taper, for example, which is formed in an ER type collet chuck suitable for receiving ER series collets such as those manufactured by Parlec, Inc. Such chucks are manufactured from a metal or metal alloy that can withstand the forces imparted thereon during machining operations. According to such embodiments, the dimensions of the primary tapered recess 14 are sized for receiving an ER series collet selected from a group of ER sizes consisting of ER-11, ER-16, ER-20, ER-25, ER-32 and ER-40. By receiving an ER collet, it is to be understood that the ER collet is inserted into the primary tapered recess 14 oriented such that the taper of the ER collet follows the taper of the primary tapered recess 14. Further, it is not necessary for the entire ER collet to be disposed within the primary tapered recess 14 to be received therein. A portion of the ER collet can remain protruding beyond the periphery of the primary tapered recess 14.

Threads 20 or another releasable fastener feature can be provided adjacent to the aperture 16 leading into the primary tapered recess 14 to cooperate with complimentary threads 21 of a threaded fastener such as a nut 22 for securing at least a portion of the tool-holding system 10 within the primary tapered recess 14.

An adaptor 25 having a tapered exterior portion 27 that closely approximates the interior dimensions of the primary tapered recess 14 is provided to fit snugly within the primary tapered recess 14. The adaptor 25 replaces a collet within the primary tapered recess in a conventional tool-holder assembly to secure the tool therein. Thus, in use, the tapered exterior 27 is snugly received within the primary tapered recess 14 in place of a collet, which would conventionally be received within the primary tapered recess 14. As with the other portions of the tool-holding system 10, the adaptor 25 is fabricated from a metal or metal alloy that can withstand the forces imparted thereon during machining operations. Embodiments of the present invention include an adaptor 25 that is forged from molten metal or metal alloy as a monolithic unit.

Similar to the primary tapered recess 14, the tapered exterior 27 of the adaptor 25 is tapered to decrease along its length (i.e., along central axis 18) from an externally-threaded portion 32 adjacent to a leading edge 34 of the adaptor 25 towards a distal end 36 that is to be inserted into the primary tapered recess 14. Again, the tapered exterior 27 can have any degree of taper suitable for being snugly inserted into the primary tapered recess 14. However, the taper closely approximates the taper of the primary tapered recess 14. For embodiments where the taper of the primary tapered recess 14 is 8 degrees relative to the central axis 18, the taper of the tapered exterior 27 is also approximately 8 degrees, which is a taper angle that is consistent with an ER standard collet to be received within an ER chuck suitable for receiving ER series collets such as those manufactured by Parlec, Inc. But regardless of the of the standard to which the primary tapered recess 14 conforms, the tapered exterior 27 and the primary tapered recess 14 both conform to the same standard. In other words, if the primary tapered recess 14 is an ER standard recess (i.e., a recess having a taper angle of approximately 8° and designed to receive an ER series collet), then the tapered exterior 27 has dimensions that are the same as, or similar to the ER collet designed to be received within that ER standard recess. Likewise, if the primary tapered recess 14 is a DA standard recess (i.e., a recess designed to receive a DA series collet), then the tapered exterior 27 has dimensions that are the same as, or similar to the DA collet that the DA standard recess was designed to receive. The primary tapered recess 14 and the tapered exterior 27 are the same style, or they are styles that compatibly similar to each other. Examples of styles or standards other than ER include DA, TG, AF, PERSKE/ORTLIB, EOC, SYOZ, RTX, and the like, and derivations thereof.

The adaptor 25 is to be snugly inserted into the primary tapered recess 14 when releasably securing the tool 12 to the rotatable spindle of the machining instrument. Although a hermetic seal between the tapered exterior 27 and the interior of the primary tapered recess 14 is not absolutely required to constitute a snug relationship, the adaptor 25 is sized to minimize spaces therebetween when the adaptor 25 is inserted into the primary tapered recess 14. The similarity between the degree to which the tapered exterior 27 is tapered and that of the interior of the primary tapered recess 14 causes a wedge-like relationship between the adaptor 25 and the primary tapered recess 14. A force parallel to axis 18 that is applied to the adaptor 25 and that urges the adaptor 25 into the primary tapered recess 14 will result in a centering force applied by the interior of the primary tapered recess 14 to the tapered exterior 27. Thus, when the adaptor 25 is fully inserted, a wedge-like relationship will be established between the adaptor 25 and the primary tapered recess 14, resulting in proper seating of the adaptor 25 at the approximate center of the primary tapered recess 14.

The adaptor 25 defines a secondary interior tapered recess 30 and comprises an exterior threaded portion 32 about an aperture 36 adjacent to a leading edge 34 of the adaptor 25 leading into the secondary tapered recess 30. Like the primary tapered recess 14, the secondary tapered recess 30 is also generally cylindrical in shape, and has an inside diameter that decreases along its length from the aperture 36 progressing towards an innermost terminal wall of the secondary tapered recess 30. Although any degree of taper suitable for receiving a collet is within the scope of the present invention, the taper can be of any degree, such as 8 degrees relative to the central axis 18 of the secondary tapered recess 30, which corresponds to a standard ER recess, for example, that is suitable for receiving ER series collets such as those manufactured by Parlec, Inc. The external threaded portion 32 or other releasable fastener is provided adjacent to the aperture 36 leading into the secondary tapered recess 30 to cooperate with complimentary threads 38 of an end cap 40, which can be any threaded fastener such as a nut, for example, for securing at least a portion of a collet 42 within the secondary tapered recess 30.

Thus, the adaptor 25 can be considered an ER-to-ER adaptor with a tapered exterior 27 having a taper angle of approximately 8° relative to the central axis 18 (i.e., an external taper angle that complies with the ER standard) and a secondary tapered recess 30 with an internal taper angle of approximately 8° relative to axis 18 (i.e., an interior taper angle that also complies with the ER standard). The tapered exterior 27 can be snugly received within an ER primary tapered recess 14 while the secondary tapered recess 30 can receive an ER collet 42 snugly therein without requiring any other members to be disposed between the ER collet 42 and the secondary tapered recess 30. The ER collet 42 received within the secondary tapered recess 30 can have dimensions of the same ER size classification as the tapered exterior 27, or one or more ER size classifications smaller than the tapered exterior 27. In this manner, the adaptor 25 can be thought of as an interface between the primary tapered recess 14 and a collet 42 with the same ER classification as the primary tapered recess 14, or that is optionally one or more ER size classifications smaller than the ER size classification of the primary tapered recess 14. And although the adaptor 25 has been described in this paragraph as an ER interface, the adaptor 25 can optionally be an interface for any of the aforementioned standards, wherein the tapered exterior 27 and the secondary tapered recess 30 have a taper angle that both comply with the same standard.

Alternate embodiments of the adaptor 25 can include a secondary tapered recess 30 with a taper angle relative to the central axis 18 that is different than the taper angle of the tapered exterior 27 relative to the axis 18. For example, the tapered exterior 27 can have a taper angle relative to the central axis 18 that complies with a first standard while the secondary tapered recess 30 has a taper angle relative to the central axis 18 that complies with a second standard, wherein the first and second standards are different. One of many possible combinations is the first standard being an ER standard while the second standard is a DA standard. Thus, in this manner, the adaptor 25 can be thought of as converting the primary tapered recess 14 from the ER standard to the DA standard. This and any other possible combinations of collet standards are within the scope of the present invention.

As such an interface, the adaptor 25 can be used to secure a tool with a base portion that would otherwise be too small to be secured to a rotatable spindle of a machining instrument equipped with an ER chuck having a primary tapered recess 14 that is designed to receive a larger tool. For example, if the primary tapered recess 14 is classified as having dimensions corresponding to the ER-40 standard, then the dimensions of the tapered exterior 27 of the adaptor 25 are approximately equal to the exterior dimensions of a size ER-40 collet, or equivalent exterior dimensions that would be compatible with a size ER-40 collet. The secondary tapered recess 30, according to the present example, however, has dimensions suitable for receiving an ER series collet having an ER size classification that is at least one ER size classification smaller than the ER series collet designed to be received within the primary tapered recess 14. Thus, the secondary tapered recess 30 of the present example would have inside dimensions compatible with a size ER-32 collet, or smaller.

Such an arrangement is illustrated in FIG. 1. Tool 12A in the A embodiment has a base portion with a larger diameter than the base portion of tool 12B shown in the B embodiment. The secondary tapered recess 30 of the adaptor 25 in the A embodiment is approximately one ER size classification less than the ER size classification of the primary tapered recess 14 provided adjacent to the end of the rotatable spindle of the machining instrument. Since the tool 12B has a base portion with a smaller diameter than the base portion of the tool 12A, a smaller collet 42 is appropriate for the B embodiment. To snugly receive the smaller collet 42, the adaptor 25 of the B embodiment includes a secondary tapered recess 30 that is two ER size classifications smaller than the ER size classification of the primary tapered recess 14.

Alternate embodiments include a secondary tapered recess 30 that is sized to receive a standard ER collet size with a tapered exterior 27 that is not a standard ER collet size. Yet other embodiments include a tapered exterior 27 with dimensions corresponding to a standard ER collet size, but the primary tapered recess 14 is not sized to receive a standard ER collet size. And as discussed above, by "received" within a tapered recess, it is meant that the ER collet is inserted into the tapered recess oriented such that the taper of the ER collet or exterior taper 27 follows the taper of the tapered recess in which it is being inserted. Further, the collet or tapered exterior 27 of the adaptor 25 is to fit snugly within the recess to minimize any gaps between the exterior of the tapered exterior 27 and the interior dimensions of the tapered recess to be considered "received" within a tapered recess. It is not sufficient for the collet or external taper 27 merely to physically fit within the tapered recess, such as in the case when an ER-11 size collet is physically inserted into a tapered recess designed to receive a size ER-40 collet.

The nut 22 or other releasable threaded fastener is provided to retain the adaptor 25 within the primary tapered recess 14. The nut 22 is a releasable fastener that comprises an internally threaded portion 21 that is cooperable with external threads 20 provided adjacent to the primary tapered recess 14 to secure the adaptor 25 therein. The nut-shaped exterior includes faces that can be gripped by a wrench or other such instrument that provides a mechanical advantage to tighten and loosen the nut 22. An inward-extending flange 46 abuts against an outward-extending flange 48 of the adaptor 25 when the nut 22 is slid over the external threaded portion 32 and generally toward the threads 20 of the primary tapered recess 14. Other embodiments of the nut 22 can alternately include an externally threaded portion that is cooperable with an internal threaded portion provided to the tapered recess 14 without departing from the scope of the present invention.

When installed, the leading edge 34 of the adaptor 25 is extended through an aperture 44 in the nut 22. The threaded portion 32 extends at least partially through the aperture 44 and beyond the nut 22. The threaded portion 32 extending beyond the nut can communicate with the internal threads 38 of the end cap 40 on a side of the nut 22 opposite the tapered exterior 27 of the adaptor 25 to secure the end cap 40 to the adaptor 25. This configuration retains the collet 42 within the secondary tapered recess 30 of the adaptor 25, and a force urging the collet 42 into the secondary tapered recess 30 can be imparted on the collet by tightening the end cap 40 on the threaded portion 32. When installed in this manner, the aperture 44 of the nut 22 encircles the threaded portion 32 of the adaptor 25 or a region adjacent to the threaded portion 32.

The collet 42 defines and interior passage 50 and is elastically deformable to constrict the base portion of the tool 12 disposed within that interior passage 50. The collet 42 is a precisely-machined sleeve formed from a metal or metal alloy that defines an essentially-tubular interior passage 50 having an inside diameter that is slightly larger than the outside diameter of the base portion of the tool 12 which it is adapted to receive. The exterior surface 52 of the collet includes a tapered or frusto-conical shaped portion 54. The collet 42 is adapted to be located within a mating, tapered or frusto-conical recess, such as the secondary tapered recess 30 for example, extending slightly out of the recess in which it is to be inserted. A plurality of longitudinal slots 56 are machined into the exterior surface of the collet 42 to allow the inner diameter of the collet 42 to decrease radially and create a grasping action on the base portion of the tool 12 inserted into the interior passage 50 of the collet 42. One or more of these slots 56 can originate at a terminal end of the collet 42, extend longitudinally along axis 18 through the collet 42, and optionally terminate short of reaching the opposite terminal end of the collet 42. Optionally, one or more of the slots 56 can extend depthwise entirely through the collet wall in which they are machined, the slots can extend only partially through the collet wall in which they are machined, or a combination thereof. Alternate embodiments include slots 56 having an alternating pattern as shown in FIG. 1, wherein every other slot 56 in a first set originates at the same terminal end, and terminates short of the longitudinally-opposing terminal end. The other set of slots 56 originates from the opposite terminal end of the collet 42 and terminates short of the terminal end that the first set of slots 56 originated from.

The gripping action of the collet 42 is effected by the inward wedging of the fingers 58 of the collet 42 formed between the slots 56 into the secondary tapered recess 30 of the adaptor 25. The axial movement of the collet 42 along axis 18 with respect to the secondary tapered recess 30, and consequently the radial movement of the fingers 58, is effected by the end cap 40 being rotationally secured to the externally-threaded portion 32 of the adaptor 25. Thus, the force applied to the collet 42 urging it into the secondary tapered recess 30 causes the fingers 58 to wedge against the internal walls of the secondary tapered recess 30. This wedging action causes the collet to elastically deform and constrict the base portion of the tool 12 that is placed within the internal passage 50 defined by the collet 42.

As previously mentioned, the end cap 40 includes internal threads 38 that are cooperable with the exterior threaded portion 32 of the adaptor 25 to urge the collet 42 into the secondary tapered recess 30 when the end cap 40 is rotationally secured to the threaded portion 32. This cooperation between the threaded portion 32 and the threads 38 of the end cap 40 results in a constricting force on the base portion of the tool 12 within the collet's internal passage 50. The end cap 40 further comprises an aperture 60 through which the base portion of the tool 12 can pass to reach the interior passage 50 defined by the collet 42, and a nut-shaped exterior that a wrench or other such instrument can grip to provide a mechanical advantage for tightening and loosening the end cap 40 on the adaptor 25. And similar to the other threaded portions discussed herein, the end cap 40 can alternately include an externally threaded portion that is cooperable with an internal threaded portion provided to a feature such as the adaptor 25 to which the end cap 40 is to be coupled without departing from the scope of the present invention.

Figure 2:
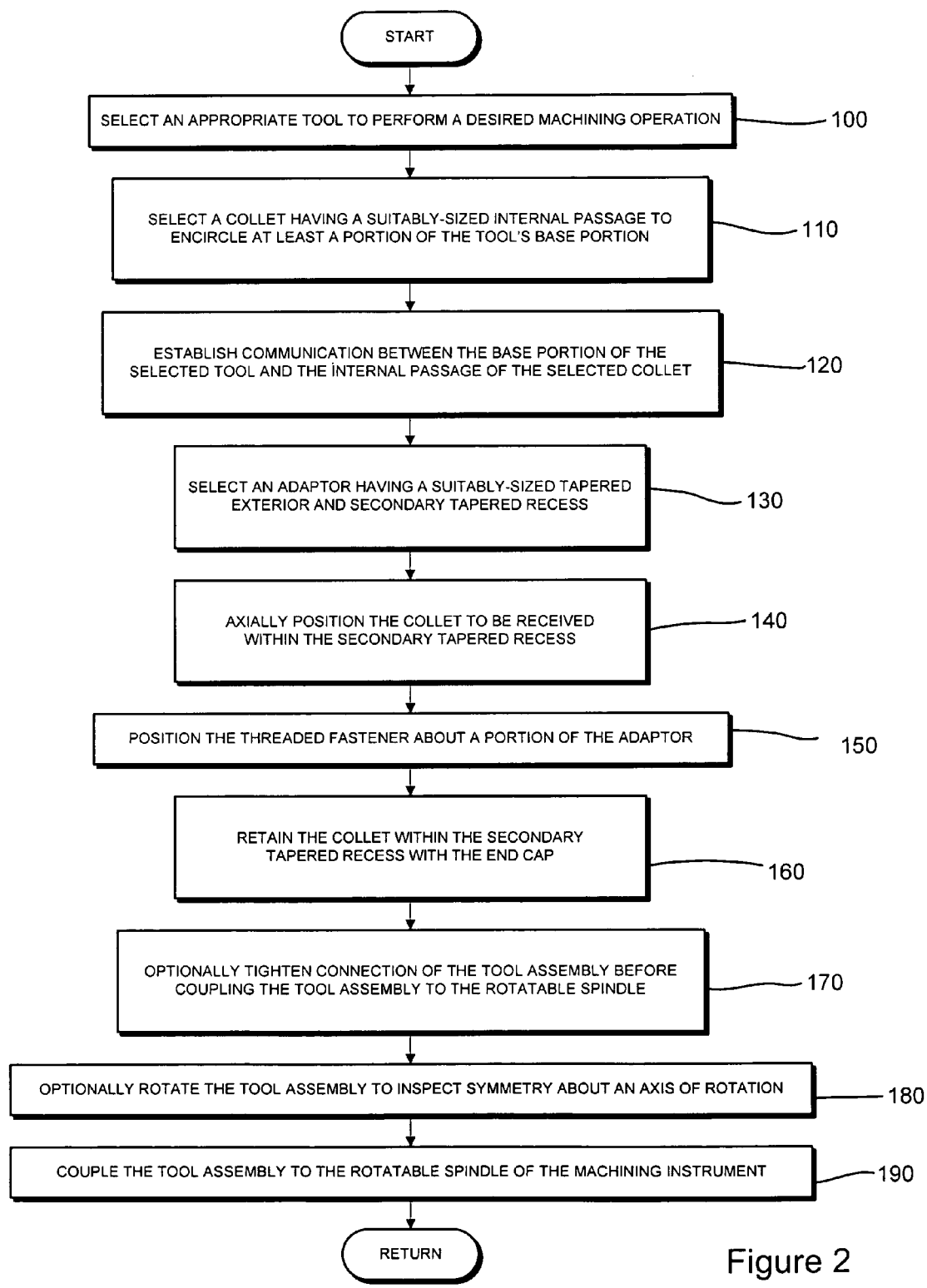
FIG. 2 is a flow diagram illustrating steps of a method in accordance with an embodiment of the present invention.

A method of securing the tool 12 to the rotatable spindle of the machining instrument, the stationary tool station, or other location where the tool is to be releasably supported is described next with reference to FIG. 2. Although the steps are shown in a particular spatial arrangement in FIG. 2, it is to be understood that the method steps can be performed in any order, including but not limited to the order shown in FIG. 2, without departing from the scope of the present invention. According to the flow diagram in FIG. 2, the method is initiated with the selection of the appropriate tool 12 for performing a particular machining operation at step 100. This selection can be made with sound engineering judgment to perform the machining operation to be conducted. For instance, to perform a desired CNC machining operation, a milling bit having the appropriate dimensions and shape for that particular CNC machining operation. Thus, selection of the appropriate tool 12 is a function of the machining operation to be conducted.

With the tool 12 selected, a suitably-sized collet 42 for encircling at least a base portion of the selected tool 12 to be used for performing a machining operation is selected with sound engineering judgment at step 110. The collet 42 chosen should define an interior passage 50 having an unbiased diameter that approximates the diameter of the selected tool 12, but is slightly larger. The base portion of the selected tool 12 is then inserted into the interior passage 50 defined by the collet 42 at step 120. Step 120 can optionally include steps to ensure that a proper length of the tool 12 will protrude from the end cap 40 to achieve the desired tolerances for the particular machining operation to be performed. The optional steps include determining a predetermined length of the tool 12 that is to extend beyond the tool holder 10 to achieve a desired proximity between a working tip of the tool 12 and a workpiece to be machined by the machining instrument when the tool 12 is coupled to the machining instrument. The optional steps further include inserting the base portion of the tool 12 a distance into the collet 42 to establish the desired proximity between the working tip of the tool 12 and the workpiece once the tool 12 is secured to the machining instrument.

An adaptor 25 having a tapered exterior 27 that is suitably sized to be received within the primary tapered recess 14, which is optionally an ER sized recess, is selected at step 130. Also at step 130, care must be exercised to select an adaptor 25 with both a suitably-sized tapered exterior 27 for the particular primary tapered recess 14 provided to the spindle, as well as a suitably-sized secondary tapered recess 30 to receive the collet 42 selected above for encircling the base portion of the tool 12. Embodiments of the present invention include an ER-compatible recess for at least one of the primary and secondary recesses 14, 30, and an ER-shaped and dimensioned collet 42, tapered exterior 27, or a combination thereof. For embodiments where both the primary and secondary tapered recesses 14, 30 are compatible with the ER standard, the secondary tapered recess 30 is selected to be at least one, and optionally two or more, ER size classifications smaller than the ER-size classification of the primary tapered recess 14. With the proper adaptor 25 chose, the collet 42 is axially adjusted relative to the adaptor 25 to be received within the secondary tapered recess 30 of the adaptor 25 along the longitudinal central axis 18 at step 140.

With the collet 42 properly seated within the secondary tapered recess 30, the nut 22 or other annular threaded fastener is slid over the externally-threaded portion 32 of the adaptor 25 that defines the aperture 36 leading into the secondary tapered recess 30 at step 150. At least a portion of the externally-threaded threaded portion 32 of the adaptor 25 extends through the aperture 36 of the annular nut 22. The collet 42 and the base portion of the tool 12 are secured within the secondary tapered recess 30 by the end cap 40, which is cooperable with the externally-threaded portion 32 of the adaptor 25 to form a tool assembly at step 160.

The tool assembly comprising the tool 12, collet 42, end cap 40, nut 22 and adaptor 25, can optionally be tightened together before the tool assembly is coupled to the spindle of the machining instrument at step 170. Further, the tool assembly can be rotated about an axis of rotation about which at least one of the adaptor 25 and the tool 12 is symmetrical at step 180 to inspect ensure that the tool 12 will be concentric with the rotatable spindle when the tool assembly is secured thereto. To couple the tool assembly to the rotatable spindle at step 190, the tapered exterior 27 of the tool assembly is received within the primary tapered recess 14 that is coupled to the rotatable spindle of the machining instrument. The nut 22 is rotated about the threaded portion 32 such that the threads 21 of the nut 22 cooperate with the threaded portion 32 to urge the tapered exterior 27 into the primary tapered recess 14.

Illustrative embodiments have been described, hereinabove. It will be apparent to those skilled in the art that the above devices and methods may incorporate changes and modifications without departing from the general scope of this invention. It is intended to include all such modifications and alterations in so far as they come within the scope of the appended claims.

What is claimed is:

1. A quick-change tool-holding system for securing a tool within a primary tapered recess adapted for receiving the tool provided to a location where the tool is to be supported, the tool-holding system comprising:
    an adaptor having a tapered exterior that closely approximates interior dimensions of the tapered recess to fit snugly within the tapered recess, wherein the adaptor defines a secondary interior tapered recess and comprises a threaded portion coaxial with an aperture leading into the secondary tapered recess;
    a threaded fastener comprising:
        a threaded portion cooperable with threads provided adjacent to the primary tapered recess to secure the adaptor therein; and
        an aperture through which at least a portion of the threaded portion of the adaptor extends when the adaptor is secured within the primary tapered recess by the threaded fastener;
    a collet comprising a plurality of slits formed therein to allow the collet to elastically deform and constrict the tool when placed within an internal passage defined by the collet; and
    an end cap with threads that are cooperable with the threaded portion of the adaptor to urge the collet into the secondary tapered recess resulting in a constricting force on the tool within the collet's internal passage.

2. The tool holding system according to claim 1, wherein the tapered exterior of the adaptor has a taper angle in compliance with an ER standard collet.

3. The tool holding system according to claim 2, wherein the [taper angle of the] tapered exterior corresponds to a size classification selected from a group of [ER] sizes [consisting of ER-11, ER-16, ER-20, ER-25, ER-32 and ER-40].

4. The tool holding system according to claim 3, wherein the secondary tapered recess has a taper angle suitable for receiving an ER series collet having a size classification that is the same as, or smaller than the [ER] size classification of the tapered exterior.

5. The tool holding system according to claim 1, wherein the threaded fastener comprises a nut with an inward flange that cooperates with an outwardly-extending flange of the adaptor to secure the adaptor within the primary tapered recess.

6. The tool holding system according to claim 1, wherein the end cap is threaded onto the threaded portion of the adaptor to secure the collet within the secondary tapered recess.

7. The tool holding system according to claim 1, wherein the primary and secondary tapered recesses are tapered at approximately 8 degrees relative to a central longitudinal axis of the adaptor.

8. The tool holding system according to claim 1, wherein the primary tapered recess is provided adjacent to a terminal end of a rotatable spindle of a machining instrument.

9. The tool holding system according to claim 8, wherein the machining instrument is selected from a group consisting of a lathe, a milling machine, and a drill.

10. The tool holding system according to claim 1, wherein the primary tapered recess is provided to a stationary tool station for storing the tool when not in use.

* * * * *